US007828692B2

(12) United States Patent
Hayashi et al.

(10) Patent No.: US 7,828,692 B2
(45) Date of Patent: Nov. 9, 2010

(54) CONTROL DEVICE OF VEHICLE, VEHICLE, AND METHOD OF CONTROLLING VEHICLE

(75) Inventors: Koji Hayashi, Toyota (JP); Masatoshi Ito, Okazaki (JP); Koki Ueno, Toyota (JP); Takeshi Kanayama, Toyota (JP); Tsuyoshi Mikami, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 596 days.

(21) Appl. No.: 11/633,413

(22) Filed: Dec. 5, 2006

(65) Prior Publication Data

US 2007/0173371 A1    Jul. 26, 2007

(30) Foreign Application Priority Data

Jan. 24, 2006   (JP)   ............................. 2006-015340

(51) Int. Cl.
*B60K 1/20*     (2006.01)
*B60W 10/04*    (2006.01)

(52) U.S. Cl. .......................................... 477/3; 477/111

(58) Field of Classification Search ..................... 477/3, 477/107, 111, 906, 97, 98, 156, 157; 180/65.31, 180/65.7
See application file for complete search history.

(56) References Cited

U.S. PATENT DOCUMENTS

| 1,558,806 | A | | 12/1921 | Hess, Jr. | |
| 5,696,680 | A | * | 12/1997 | Ichioka et al. | ................ 701/67 |
| 5,944,632 | A | * | 8/1999 | Hara et al. | ................ 477/158 |
| 6,110,072 | A | * | 8/2000 | Harada et al. | ................ 477/157 |
| 6,647,326 | B2 | * | 11/2003 | Nakamori et al. | ............. 701/22 |
| 2002/0094910 | A1 | | 7/2002 | Endo et al. | |
| 2003/0045988 | A1 | | 3/2003 | Suzuki et al. | |
| 2003/0109970 | A1 | | 6/2003 | Nakamori et al. | |
| 2003/0171187 | A1 | | 9/2003 | Aoki et al. | |
| 2004/0038774 | A1 | | 2/2004 | Kuroda et al. | |
| 2004/0063539 | A1 | | 4/2004 | Endo et al. | |
| 2008/0139360 | A1 | * | 6/2008 | Hayashi et al. | ................ 477/3 |

FOREIGN PATENT DOCUMENTS

| JP | 08182114 A | * | 7/1996 |
| JP | A-10-89445 | | 4/1998 |
| JP | A-11-093721 | | 4/1999 |
| JP | A 2002-225578 | | 8/2002 |
| JP | A 2005-207304 | | 8/2005 |
| JP | A-2005-329787 | | 12/2005 |
| JP | 2007190973 A | * | 8/2007 |
| WO | WO 2005/070717 A1 | | 8/2005 |

* cited by examiner

*Primary Examiner*—Roger Pang
(74) *Attorney, Agent, or Firm*—Oliff & Berridge, PLC (57) ABSTRACT

A control device causes a motor-generator to stop while a shift lever is set to a neutral position, and changes the rotation speed of an electric oil pump from a first rotation speed to a second rotation speed lower than the first rotation speed if a state of the electric oil pump in a hydraulic pressure control device enters a state where it is not preferable to continue operation at the first rotation speed. Preferably, the control device warns a driver to change the shift lever position from the neutral-position to another position if the vehicle satisfies a prescribed warning condition. Further preferably, the control device sets the vehicle to a running non-permitted state if the shift lever position is not changed from the neutral position to another position after warning.

11 Claims, 6 Drawing Sheets

CONTROL DEVICE OF VEHICLE, VEHICLE, AND METHOD OF CONTROLLING VEHICLE

This nonprovisional application is based on Japanese Patent Application No. 2006-015340 filed with the Japan Patent Office on Jan. 24, 2006, the entire contents of which are hereby incorporated by reference.

BACKGROUND OF THE INVENTION

1. Field of the Invention

The present invention relates to a control device of a vehicle and to a vehicle, and more particularly to a control device of a vehicle using a hydraulic pressure generated by using an electric oil pump and a mechanical oil pump in combination as well as to a vehicle.

2. Description of the Background Art

Japanese Patent Laying-Open No. 2005-207304 discloses a hybrid vehicle including an electric oil pump generating a hydraulic pressure and a mechanical oil pump driven by an engine and generating a hydraulic pressure, in which drive force from a motor is transmitted to drive wheels through a hydraulically controlled transmission.

Weight of the electric oil pump and power consumption are greater as hydraulic pressure generation capability thereof is higher. Accordingly, in the case of a hybrid vehicle, it is often more advantageous to compensate for the hydraulic pressure with the mechanical oil pump by operating the engine when the hydraulic pressure generation capability is insufficient, rather than to secure sufficient capability of the electric oil pump.

In such a case, if the electric oil pump continuously operates and approaches its operation limit due to overheat or the like, it is necessary to start the engine and to actuate the mechanical oil pump. If a shift lever is set to an N (neutral) position, however, the engine cannot be started and load of the electric oil pump cannot be mitigated in some cases.

In other words, if the shift lever is set to the neutral position and a shift range is set to an N range, drive force should not transmit to the wheels, and hence the motor capable of driving the wheels is in a shutdown state. In the hybrid vehicle that uses the motor capable of driving the wheels for starting the engine, accordingly, the motor for cranking the engine cannot be operated if the shift range is set to the N range.

SUMMARY OF THE INVENTION

An object of the present invention is to provide a control device of a vehicle and a vehicle maintaining a running permitted state as long as possible while protecting an electric oil pump.

In summary, the present invention is directed to a control device of a vehicle, the vehicle including a drive wheel, a first rotating electric machine generating drive torque for the drive wheel, a hydraulic transmission transmitting the drive torque from the first rotating electric machine to the drive wheel, an electric oil pump generating a source hydraulic pressure for the hydraulic transmission, an internal combustion engine operated in order to drive the drive wheel, a mechanical oil pump rotating upon receiving mechanical power from the internal combustion engine and generating the source hydraulic pressure, and a shift lever for switching a shift range. The control device causes the first rotating electric machine to stop while the shift lever is set to a neutral position, and changes the rotation speed of the electric oil pump from a first rotation speed to a second rotation speed lower than the first rotation speed if a state of the electric oil pump enters a state where it is not preferable to continue operation at the first rotation speed.

Preferably, the control device warns a driver to change a position of the shift lever from the neutral position to another position if the vehicle satisfies a prescribed warning condition. The prescribed warning condition includes a condition that the state of the electric oil pump enters the state where it is not preferable to continue operation at the first rotation speed.

More preferably, the control device sets the vehicle to a running non-permitted state if the position of the shift lever is not changed from the neutral position to another position after warning.

Preferably, the vehicle further includes a second rotating electric machine generating start torque to start the internal combustion engine, and a power split device in which three input shafts are mechanically coupled to a crankshaft of the internal combustion engine, a rotation shaft of the first rotating electric machine, and a rotation shaft of the second rotating electric machine respectively. In the power split device, when rotation of any two input shafts of the three input shafts is set, rotation of remaining one input shaft is forcibly set. The control device causes the second rotating electric machine to stop while the shift lever is set to the neutral position and sets the vehicle to a state where start of the internal combustion engine is not permitted.

According to another aspect of the present invention, the present invention is directed to a vehicle including a drive wheel, a first rotating electric machine generating drive torque for the drive wheel, a hydraulic transmission transmitting the drive torque from the first rotating electric machine to the drive wheel, an electric oil pump generating a source hydraulic pressure for the hydraulic transmission, an internal combustion engine operated in order to drive the drive wheel, a mechanical oil pump rotating upon receiving mechanical power from the internal combustion engine and generating the source hydraulic pressure, a shift lever for switching a shift range, and a control device causing the first rotating electric machine to stop while the shift lever is set to a neutral position, and changing the rotation speed of the electric oil pump from a first rotation speed to a second rotation speed lower than the first rotation speed if a state of the electric oil pump enters a state where it is not preferable to continue operation at the first rotation speed.

Preferably, the control device warns a driver to change a position of the shift lever from the neutral position to another position if the vehicle satisfies a prescribed warning condition, and the prescribed warning condition includes a condition that the state of the electric oil pump enters the state where it is not preferable to continue operation at the first rotation speed.

More preferably, the control device sets the vehicle to a running non-permitted state if the position of the shift lever is not changed from the neutral position to another position after warning.

Preferably, the vehicle further includes a second rotating electric machine generating start torque to start the internal combustion engine, and a power split device in which three input shafts are mechanically coupled to a crankshaft of the internal combustion engine, a rotation shaft of the first rotating electric machine, and a rotation shaft of the second rotating electric machine respectively. In the power split device, when rotation of any two input shafts of the three input shafts is set, rotation of remaining one input shaft is forcibly set. The control device causes the second rotating electric machine to stop while the shift lever is set to the neutral position and sets the vehicle to a state where start of the internal combustion engine is not permitted.

According to yet another aspect of the present invention, the present invention is directed to a method of controlling a vehicle including a drive wheel, a first rotating electric machine generating drive torque for the drive wheel, a hydraulic transmission transmitting the drive torque from the first rotating electric machine to the drive wheel, an electric oil pump generating a source hydraulic pressure for the hydraulic transmission, an internal combustion engine operated in order to drive the drive wheel, a mechanical oil pump rotating upon receiving mechanical power from the internal combustion engine and generating the source hydraulic pressure, and a shift lever for switching a shift range. The method of controlling a vehicle includes the steps of: determining whether the shift range of the vehicle is set to a neutral range during stop of the internal combustion engine; and changing the rotation speed of the electric oil pump from a first rotation speed to a second rotation speed lower than the first rotation speed if a state of the electric oil pump enters a state where it is not preferable to continue operation at the first rotation speed.

Preferably, the method of controlling a vehicle further includes the step of warning a driver to change a position of the shift lever from a neutral position to another position if the vehicle satisfies a prescribed warning condition. The prescribed warning condition includes a condition that the state of the electric oil pump enters the state where it is not preferable to continue operation at the first rotation speed.

More preferably, the method of controlling a vehicle further includes the step of setting the vehicle to a running non-permitted state if the position of the shift lever is not changed from the neutral position to another position after warning.

According to the present invention, a running permitted state of the vehicle is maintained as long as possible, while protecting the electric oil pump.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will be described hereinafter in detail with reference to the drawings. The same or corresponding elements in the drawings have the same reference characters allotted, and detailed description thereof will not be repeated.

[Structure of Vehicle]

Figure 1:
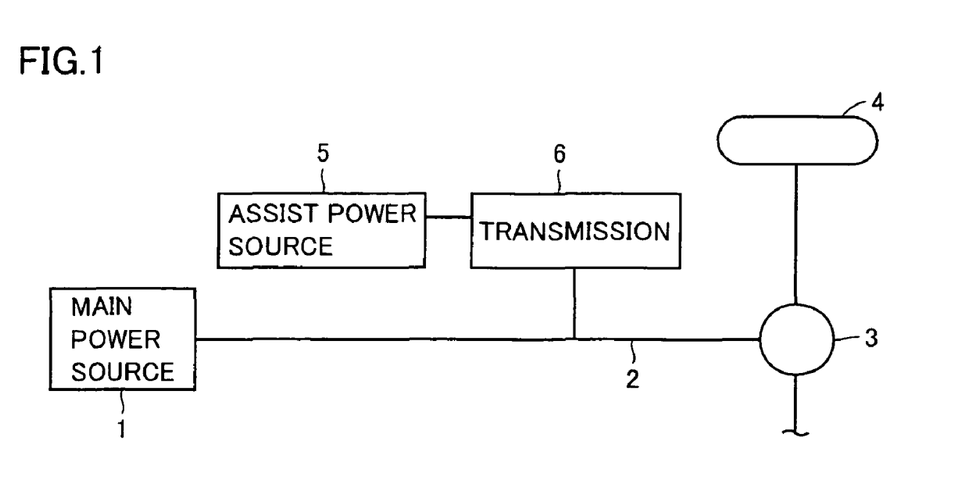
FIG. 1 is a schematic diagram showing a configuration of a hybrid vehicle according to an embodiment of the present invention.

FIG. 1 is a schematic diagram showing a configuration of a hybrid vehicle according to an embodiment of the present invention.

Referring to FIG. 1, the hybrid vehicle according to the present embodiment includes a main power source 1, an assist power source 5, a transmission 6, an output shaft 2, a differential gear 3, and a drive wheel 4.

Torque of main power source 1 is transmitted to output shaft 2, and the torque is transmitted from output shaft 2 through differential gear 3 to drive wheel 4.

Meanwhile, assist power source 5 capable of power running control for outputting drive force for running or regenerative control for recovering energy is provided and coupled to output shaft 2 with transmission 6 being interposed. Therefore, the torque transmitted between assist power source 5 and output shaft 2 is increased/decreased in accordance with a gear ratio set in transmission 6.

Transmission 6 above can be configured such that the gear ratio is set to at least "1". Configured in this manner, in power running in which torque is output from assist power source 5, the torque output from assist power source 5 can be increased and transmitted to output shaft 2. Therefore, assist power source 5 can be of low capacity or of a small size.

On the other hand, it is preferable to maintain satisfactory operation efficiency of assist power source 5. Accordingly, for example, if the number of rotations of output shaft 2 is increased in accordance with the vehicle speed, the gear ratio is lowered so as to lower the number of rotations of assist power source 5. Meanwhile, if the number of rotations of output shaft 2 is lowered, the gear ratio may be increased.

Figure 2:
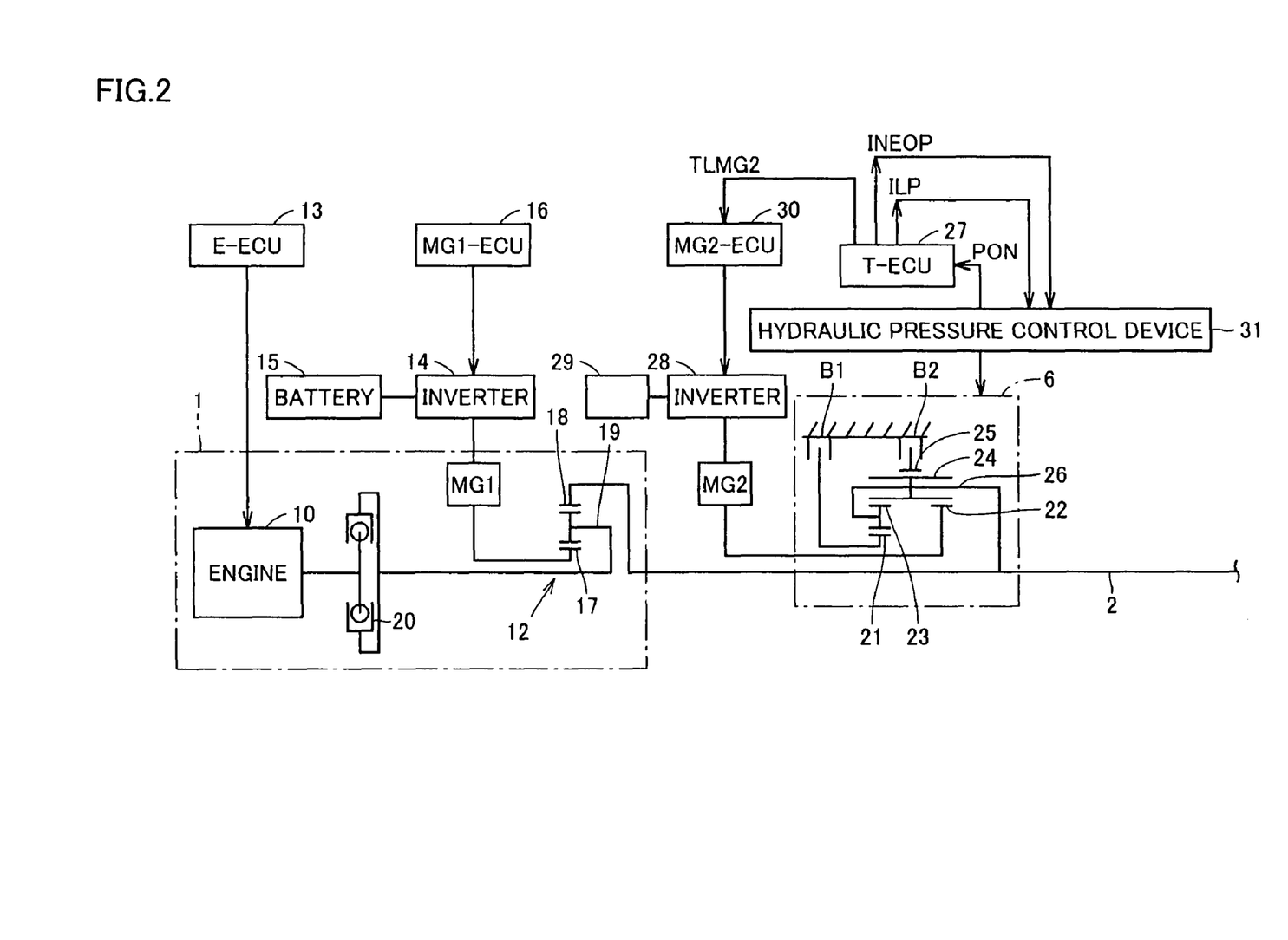
FIG. 2 illustrates in detail a configuration of a main power source 1 and a transmission 6 in FIG. 1.

FIG. 2 illustrates in detail a configuration of main power source 1 and transmission 6 in FIG. 1.

Referring to FIG. 2, main power source 1 includes an internal combustion engine (hereinafter, referred to as an engine) 10, a motor-generator MG1, and a planetary gear mechanism 12 combining or distributing torque between engine 10 and motor-generator MG1.

Engine 10 serves as a known power unit outputting power by burning fuel, such as a gasoline engine and a diesel engine, and engine 10 is configured such that an operation state such as a throttle position (intake air amount), a fuel supply amount, ignition timing, or the like can electrically be controlled. Engine 10 is controlled, for example, by an electronic control unit (E-ECU) mainly constituted of a microcomputer.

Motor-generator MG1 is connected to a power storage apparatus 15 such as a battery with an inverter 14 being interposed. For example, a permanent magnet synchronous motor attaining a function as a motor and a function as a generator may be used as motor-generator MG1.

By controlling inverter 14, output torque or regenerative torque of motor-generator MG1 is appropriately set. In order to control inverter 14, an electronic control unit (MG1-ECU) 16 mainly constituted of a microcomputer is provided. It is noted that a stator (not shown) of motor-generator MG1 is fixed and does not rotate.

Planetary gear mechanism 12 includes a sun gear 17 which is an external gear, a ring gear 18 which is an internal gear arranged concentrically with respect to sun gear 17, and a carrier 19 holding a pinion gear engaged with sun gear 17 and ring gear 18 such that it rotates on its axis and revolves around carrier 19, and planetary gear mechanism 12 serves as a known gear mechanism attaining a differential action with these elements serving as three rotation elements. An output shaft of engine 10 is coupled to carrier 19 serving as the first rotation element, with a damper 20 being interposed. In other words, carrier 19 serves as a power input element of planetary gear mechanism 12.

In contrast, a rotor of motor-generator MG1 is coupled to sun gear 17 serving as the second rotation element. Therefore, sun gear 17 serves as what is called a reaction element of planetary gear mechanism 12, while ring gear 18 which is the third rotation element serves as a power output element of planetary gear mechanism 12. Ring gear 18 is coupled to output shaft (that is, a propeller shaft) 2.

Meanwhile, in the example shown in FIG. 2, transmission 6 is constituted of a set of Ravigneaux planetary gear mechanisms. Namely, a first sun gear (S1) 21 and a second sun gear (S2) 22, each of which is an external gear, are provided. A first pinion 23 is engaged with first sun gear 21, first pinion 23 is engaged with a second pinion 24, and second pinion 24 is engaged with a ring gear (R) 25 arranged concentrically with each sun gear 21, 22.

A carrier (C) 26 holds each pinion 23, 24 such that it rotates on its axis and revolves around carrier 26. In addition, second sun gear 22 is engaged with second pinion 24. Therefore, first sun gear 21 and ring gear 25 constitute a double-pinion-type planetary gear mechanism together with each pinion 23, 24, and second sun gear 22 and ring gear 25 constitute a single-pinion-type planetary gear mechanism together with second pinion 24.

In addition, a brake B1 selectively fixing first sun gear 21 and a brake B2 selectively fixing ring gear 25 are provided. These brakes B1, B2 are what is called a friction engagement apparatus generating engagement force by means of friction force, and a multiple-disc type engagement apparatus or a band-type engagement apparatus may be adopted as the brake. These brakes B1, B2 are configured such that torque capacity thereof continuously varies in accordance with the engagement force resulting from the hydraulic pressure. Moreover, a motor-generator MG2 serving as the assist power source is coupled to second sun gear 22, and carrier 26 is coupled to output shaft 2.

Therefore, transmission 6 described above is configured such that second sun gear 22 serves as what is called a power input element, carrier 26 serves as a power output element, a high-speed gear at which gear ratio is higher than "1" is set by engaging brake B1, and a low-speed gear greater in the gear ratio than the high-speed gear is set by engaging brake B2 instead of brake B1. Change in the gears is made based on a running state such as a vehicle speed, requested drive force (or accelerator position), and the like. More specifically, each gear applying region is defined in advance as a map (shift map), and the transmission is controlled so as to set any of the transmitting gears in accordance with the detected operation state. An electronic control unit (T-ECU) 27 for such control, mainly constituted of a microcomputer, is provided.

In the example shown in FIG. 2, motor-generator MG2 capable of power running for outputting torque and regeneration for recovering energy is adopted as assist power source 5 in FIG. 1. For example, a permanent magnet synchronous motor may be used as motor-generator MG2. A rotor of motor-generator MG2 is connected to second sun gear 22. It is noted that a stator (not shown) of motor-generator MG2 is fixed and does not rotate. In addition, motor-generator MG2 is connected to a battery 29 with an inverter 28 being interposed.

An electronic control unit (MG2-ECU) 30 mainly constituted of a microcomputer controls, by controlling inverter 28, power running and regeneration as well as torque of motor-generator MG2 in each case.

It is noted that battery 29 and electronic control unit 30 may be integrated with inverter 14 and battery (power storage apparatus) 15 of motor-generator MG1. In addition, a plurality of electronic control units shown in FIG. 2 are not necessarily required. A smaller number of electronic control units or a single electronic control unit may be provided.

Figure 3:
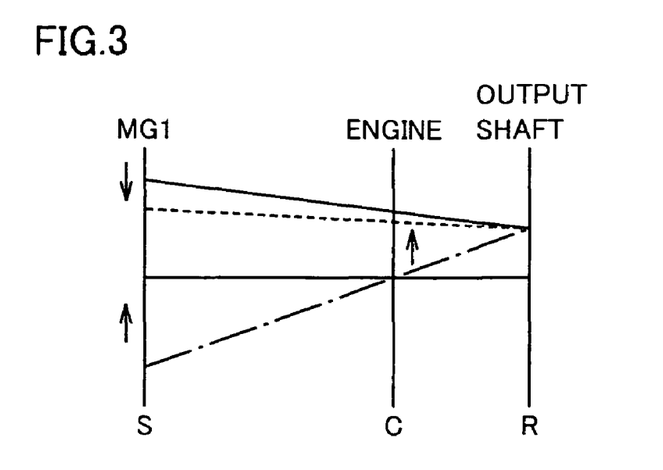
FIG. 3 is a nomographic chart of a single-pinion-type planetary gear mechanism 12 in FIG. 2.

FIG. 3 is a nomographic chart of single-pinion-type planetary gear mechanism 12 in FIG. 2.

Referring to FIG. 3, when reaction torque from motor-generator MG1 is input to sun gear (S) 17 with respect to the torque output by engine 10 and input to carrier (C) 19, torque of magnitude obtained as a result of addition/subtraction of these torques appears in ring gear (R) 18 serving as the power output element.

Here, the torque rotates the rotor of motor-generator MG1, and motor-generator MG1 serves as the generator. In addition, if the number of rotations of ring gear 18 (the number of output rotations) is constant, the engine speed of engine 10 can continuously be varied by increasing/decreasing the number of rotations of motor-generator MG1. Namely, engine 10 can be controlled, for example, to attain an engine speed at which best fuel efficiency is achieved, by controlling motor-generator MG1.

In addition, as shown with a chain dotted line in FIG. 3, if engine 10 has been caused to stop during running, motor-generator MG1 rotates in a reverse direction. When motor-generator MG1 is caused to function as the motor from that state and torque in a direction of forward rotation is output, torque in a direction of forward rotation of engine 10 is applied to engine 10 coupled to carrier 19, and starting (motoring or cranking) of engine 10 can thus be achieved by motor-generator MG1.

Here, the torque in a direction to stop rotation of the output shaft is applied to output shaft 2. Therefore, drive torque for running can be maintained by controlling the torque output by motor-generator MG2, and starting of engine 10 can simultaneously be performed smoothly. It is noted that such a hybrid scheme is referred to as a mechanical distribution type or a split type.

Figure 4:
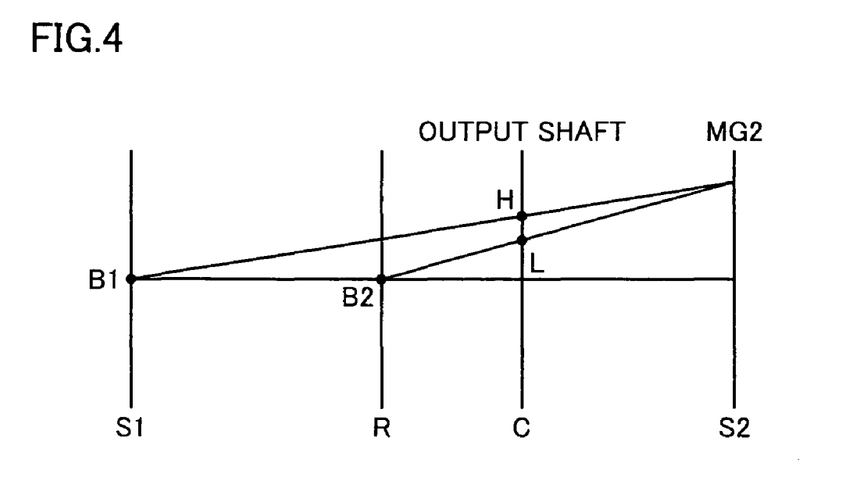
FIG. 4 is a nomographic chart of a gear mechanism constituting transmission 6 in FIG. 2.

FIG. 4 is a nomographic chart of a gear mechanism constituting transmission 6 in FIG. 2.

Referring to FIG. 4, if ring gear 25 is fixed by brake B2, low-speed gear L is set and the torque output by motor-generator MG2 is amplified in accordance with the gear ratio and then applied to output shaft 2. In contrast, if first sun gear 21 is fixed by brake B1, high-speed gear H smaller in the gear ratio than low-speed gear L is set. The gear ratio at high-speed gear H is also greater than "1". Therefore, the torque output by motor-generator MG2 is amplified in accordance with the gear ratio and then applied to output shaft 2.

While each shift position L, H is steadily set, the torque obtained by increasing the torque output by motor-generator MG2 in accordance with the gear ratio is applied to output shaft 2. In a transmission transition state, however, the torque is affected by the torque capacity in each brake B1, B2 or by inertial torque generated as a result of change in the number of rotations. The torque applied to output shaft 2 is positive in a drive state of motor-generator MG2, while it is negative in a driven state.

Figure 5:
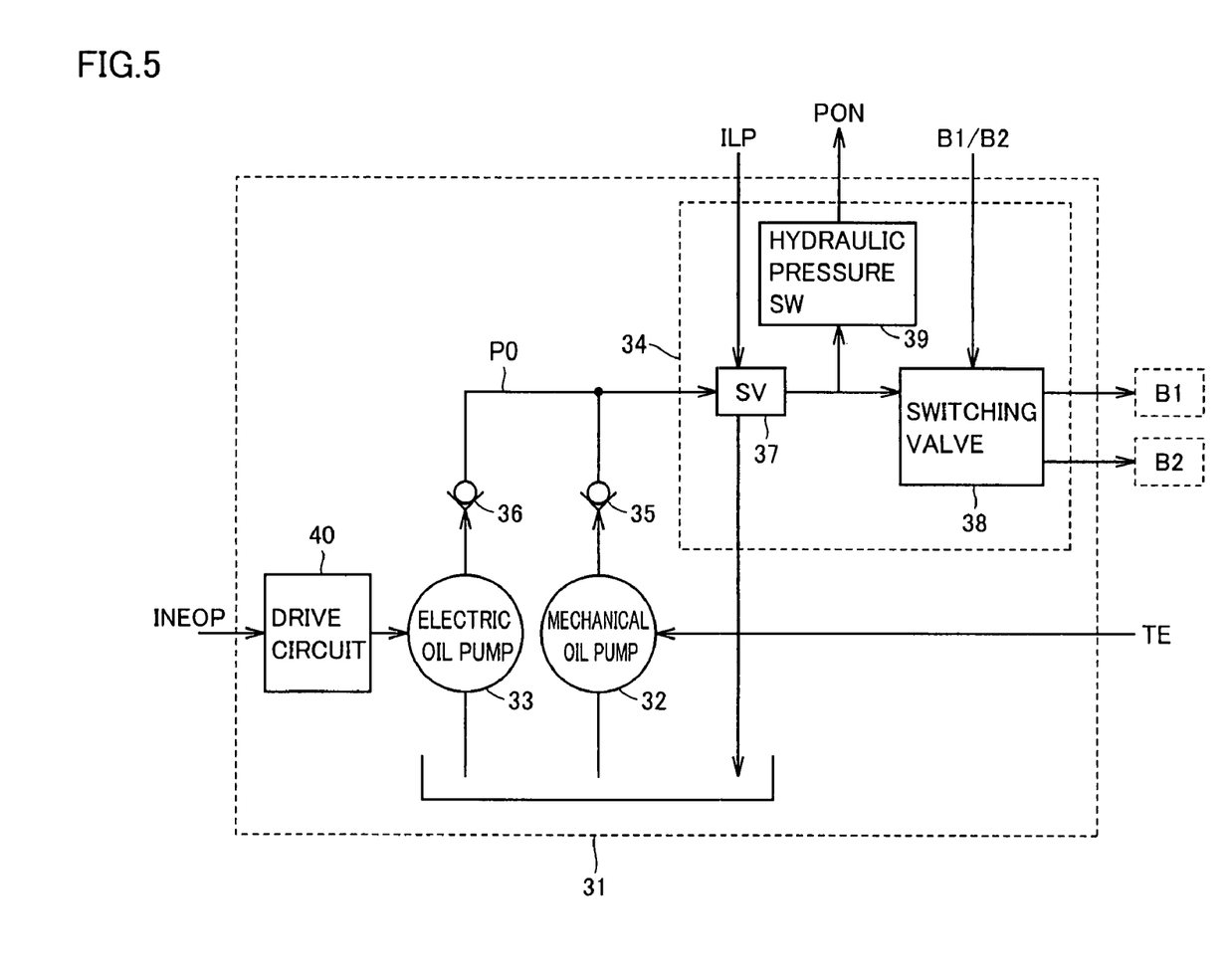
FIG. 5 is a block diagram showing a configuration of a hydraulic pressure control device 31 in FIG. 2.

FIG. 5 is a block diagram showing a configuration of hydraulic pressure control device 31 in FIG. 2.

Hydraulic pressure control device 31 shown in FIG. 5 controls engagement/release of each brake B1, B2 in FIG. 2 by applying/releasing the hydraulic pressure. Hydraulic pressure control device 31 includes a mechanical oil pump 32 rotated by torque TE generated along with rotation of the engine, a drive circuit 40 receiving a rotation speed instruction INEOP from T-ECU 27, an electric oil pump 33 of which number of rotation is controlled by drive circuit 40, check valves 35, 36, and a hydraulic pressure circuit 34.

Hydraulic pressure circuit 34 regulates the hydraulic pressure generated by oil pumps 32, 33 to a line pressure, applies/releases the hydraulic pressure regulated by assuming the line pressure as the source pressure to/from brake B1, B2, and supplies oil for lubrication to a not-shown appropriate portion.

Mechanical oil pump 32 is a pump driven by engine 10 and generating the hydraulic pressure. For example, mechanical oil pump 32 is arranged coaxially on the output side of damper 20, and operates upon receiving torque TE from engine 10.

Meanwhile, electric oil pump 33 is a pump driven by a motor included in drive circuit 40. Electric oil pump 33 is attached to an appropriate portion such as the outside of a casing (not shown), operates upon receiving electric power from the power storage apparatus such as a battery, and generates the hydraulic pressure.

Hydraulic pressure circuit 34 includes a plurality of solenoid valves and a switching valve or a pressure-regulating valve, and it is configured such that pressure regulation or application/release of hydraulic pressure can electrically be controlled. FIG. 5 shows, as representatives, a solenoid valve 37 switching between high/low of the line pressure in accordance with a line pressure instruction ILP, a switching valve 38 selectively applying the line pressure output by solenoid valve 37 to brake B1, B2, and a hydraulic pressure switch 39 outputting a hydraulic pressure detection signal PON when the line pressure is raised to a threshold value.

On the discharge side of each oil pump 32, 33, check valves 35, 36 that open by the discharge pressure of each oil pump 32, 33 and close in a direction opposite thereto are provided. These oil pumps 32, 33 are connected in parallel to each other with respect to hydraulic pressure circuit 34. Solenoid valve 37 is configured to control the line pressure to two states: a state where a discharge amount is increased in accordance with line pressure instruction ILP to raise the line pressure; and a state to the contrary where the discharge amount is decreased to lower the line pressure.

As the hybrid vehicle described above includes two power sources of main power source 1 and assist power source 5, operation at high fuel efficiency generating a small amount of exhaust gas is performed by utilizing these power sources. Even when engine 10 is driven, the engine speed of engine 10 is controlled by motor-generator MG1 such that optimal fuel efficiency is attained. In addition, inertial energy of the vehicle is regenerated as electric power in braking. If motor-generator MG2 is driven for torque assist, in the state where the vehicle speed is low, transmission 6 is set to low-speed gear L so as to increase the torque applied to output shaft 2, while in the state where the vehicle speed is increased, transmission 6 is set to high-speed gear H so as to attain relatively lower number of rotations of motor-generator MG2 and reduce loss. Torque assist at high efficiency is thus carried out.

The hybrid vehicle described above is capable of any of running using power of engine 10, running using engine 10 and motor-generator MG2, and running using only motor-generator MG2, and the running type is determined and selected based on a drive request amount such as accelerator position, vehicle speed, or the like.

For example, when the amount of power storage in the battery is sufficient and the drive request amount is relatively small or when quiet start is manually selected, a running type similar to that of an electric vehicle using motor-generator MG2 (hereinafter, tentatively denoted as EV running) is selected and engine 10 is stopped.

When the drive request amount is increased from that state, for example by pressing of an accelerator pedal to a large extent, or when the power storage amount in the battery is lowered, or when switching from quiet start to normal running is manually made, engine 10 is started and switching to a type of running using engine 10 (hereinafter, tentatively denoted as E/G running) is made.

In the example above, starting of engine 10 is carried out in such a manner that motor-generator MG1 is caused to function as the motor and the torque is transmitted to engine 10 via planetary gear mechanism 12, so as to carry out motoring (cranking).

Here, if torque is applied to sun gear 17 by motor-generator MG1 in a direction of forward rotation thereof as shown in FIG. 3, torque in a direction of reverse rotation of ring gear 18 is applied to ring gear 18. As ring gear 18 is coupled to output shaft 2, the torque generated in starting engine 10 serves as the torque in a direction of deceleration of the vehicle. Then, at the time of start of engine 10, the torque is output from motor-generator MG2 so as to cancel what is called reaction torque as above.

Therefore, at the time of start of engine 10, as a result of increase in the torque output from motor-generator MG2, torque applied to transmission 6, more specifically torque applied to any brake B1, B2 engaged at that time point for setting the shift position, is transitively increased.

As described above, the hydraulic pressure of brake B1, B2 is required even at the time of start of the engine, and naturally, it is further important in starting the vehicle.

Meanwhile, it is possible that the driver leaves the shift lever set in neutral position for a long time. If the shift lever is set to the neutral position and the shift range is set to the N range, drive force should not transmit to the wheels, and hence the motor capable of driving the wheels is in the turned off state. Therefore, in the hybrid vehicle using the motor capable of driving the wheels for starting the engine, the motor for cranking the engine cannot be operated if the N range is set.

On the other hand, a case in which the accelerator is fully pressed for acceleration immediately after switching the shift lever from the neutral position to the drive range is also possible. Therefore, even when the shift lever is in the neutral position, a state where the hydraulic pressure is raised to some extent should be kept, so that the torque of motor-generator MG2 can sufficiently be transmitted to the drive wheels with good response.

[Control of Electric Oil Pump]

Figure 6:
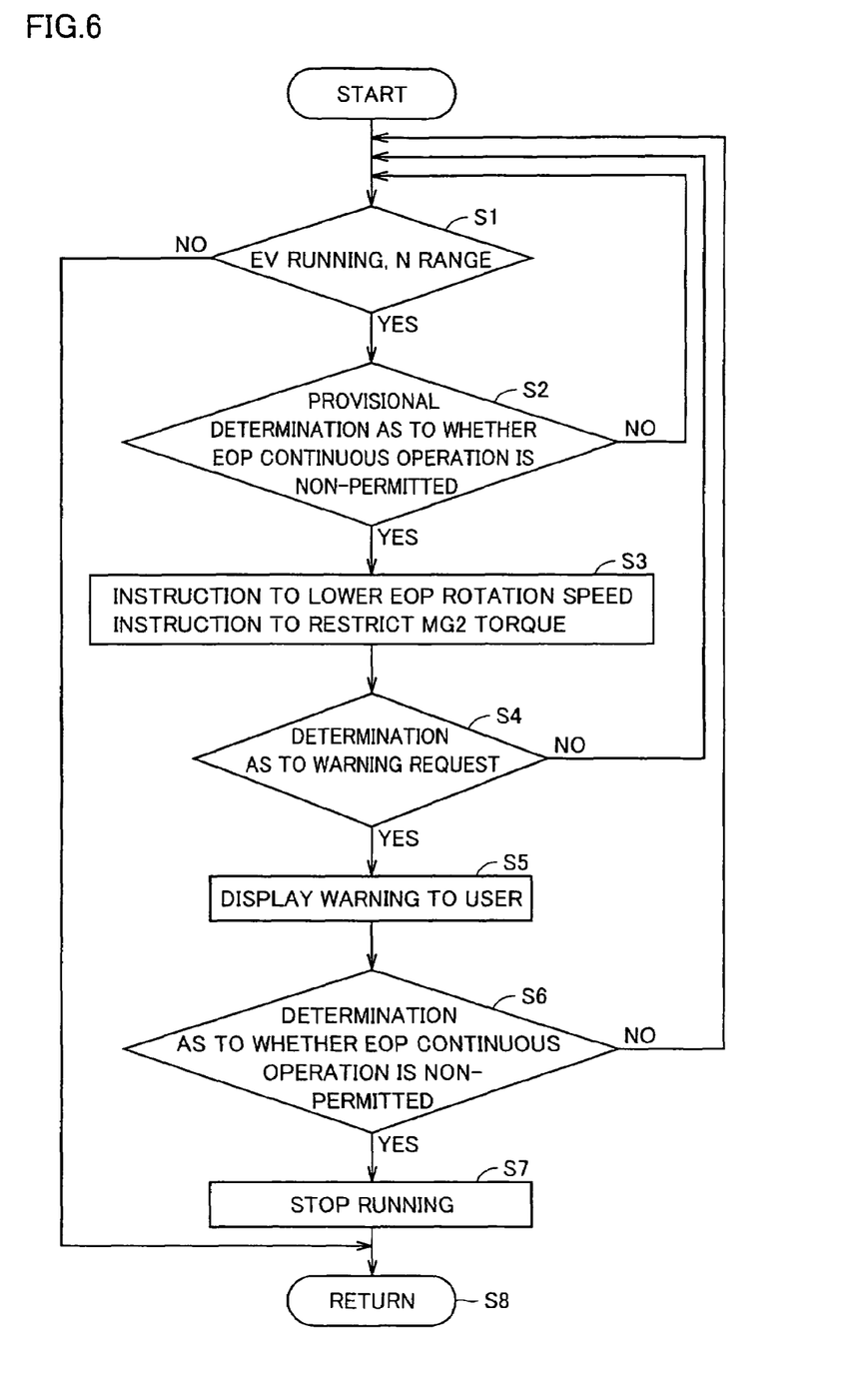
FIG. 6 is a flowchart showing a configuration for control executed by a control device (T-ECU) 27 in the embodiment of the present invention.

FIG. 6 is a flowchart showing a configuration for control executed by control device (T-ECU) 27 in the embodiment of the present invention. The processing in the flowchart is called and executed every predetermined time from a prescribed main routine or each time a prescribed condition is satisfied.

Figure 7:
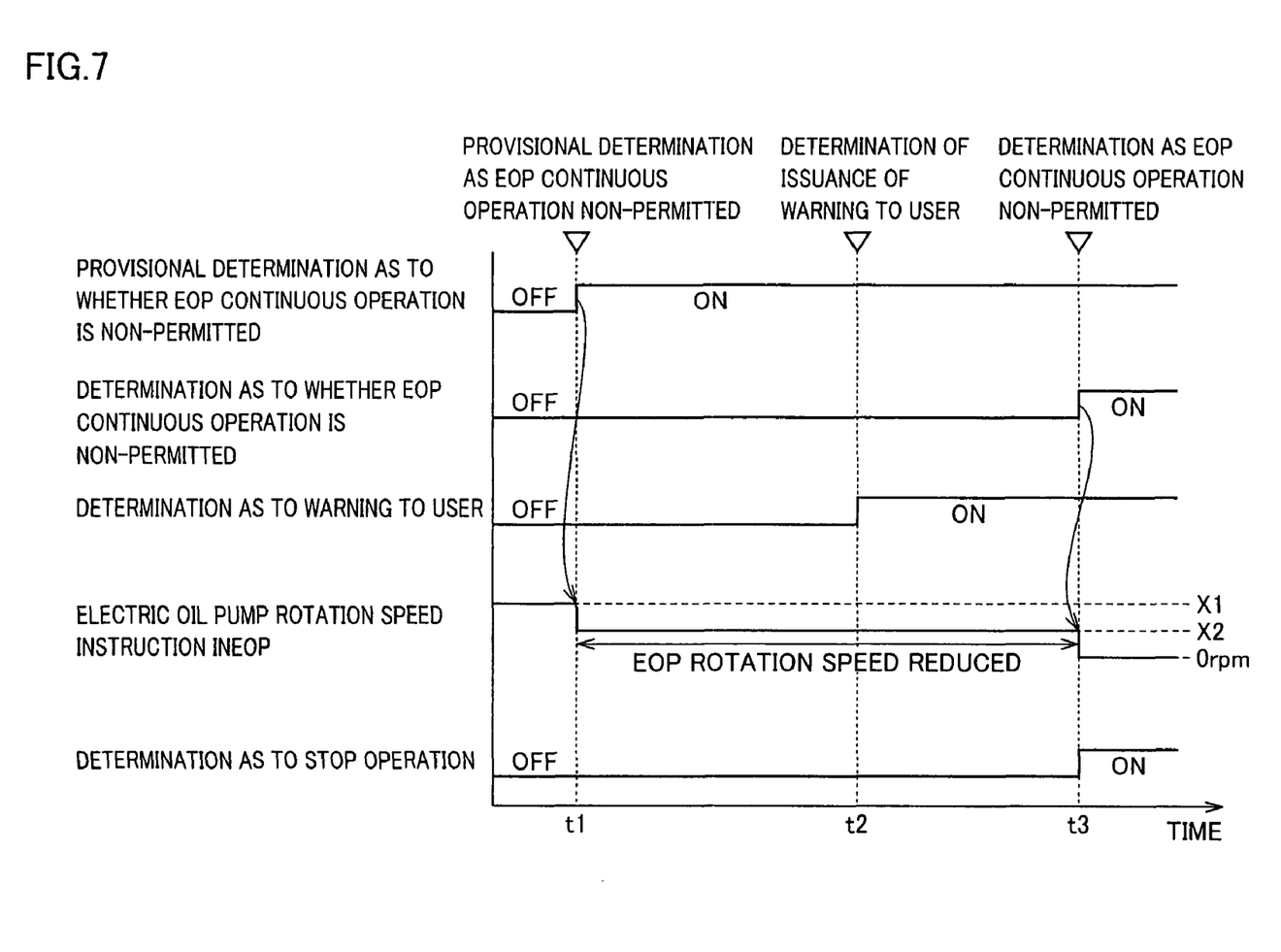
FIG. 7 is an operational waveform diagram for illustrating an operation in the embodiment of the present invention.

FIG. 7 is an operational waveform diagram for illustrating an operation in the embodiment of the present invention.

Referring to FIGS. 6 and 7, first in the initial state, control device 27 determines in step S1 whether or not the vehicle is in EV running (running during engine stop), the shift lever is set to the neutral position, and the shift range is set to the N range.

If the vehicle is not in the EV running or the shift range is not set to the N range, the process proceeds to step S8 and control moves to the main routine.

If it is determined in step S1 that the vehicle is in EV running and the shift range is set to the N range, successively in step S2, provisional determination as to whether continuous operation of the electric oil pump is non-permitted is made. The condition for this determination includes, for example, a condition that a time period of continuous operation of the electric oil pump exceeds a prescribed time period, a condition that a temperature of the electric oil pump (or a temperature sensed by a thermistor contained in drive circuit 40 driving the electric oil pump) exceeds a prescribed temperature, and the like.

Until time t1, the processing in step S1 and step S2 is repeated. If it is provisionally determined at time t1 that the continuous operation of the electric oil pump is not permitted, the process proceeds to step S3. In step S3, an instruction to reduce the number of rotations of the electric oil pump is issued and the rotation speed is reduced from X1 to X2. Then, with decrease in the hydraulic pressure, torque of motor-generator MG2 is restricted. Such torque restriction prevents slip in brake B1 or B2 in transmission 6.

After the processing in step S3, in step S4, whether a warning should be issued to the driver or not is determined. For example, the determination condition includes elapse of a prescribed time period since reduction in the number of rotations of the electric oil pump at time t1, continued temperature increase around the electric oil pump in spite of reduction in the number of rotations, and the like. During a period from time t1 to t2, the processing in step S1 to step S4 is repeated.

If it is determined at time t2 that the warning condition in step S4 is satisfied, the process proceeds to step S5 and warning to the driver is issued. For example, a message stating that "move the shift lever from N position to P position" is displayed on a display screen of a driver's seat along with alarm sound, voice or the like. In step S6 following step S5, determination as to whether continuous operation of the electric oil pump is non-permitted is made. For example, a temperature condition more strict than in provisional determination in step S2 may be employed as the determination condition, and a state that the shift lever has not yet been moved from the neutral position to another position even after a prescribed time period has elapsed since warning at time t2 may be employed as the determination condition.

During a period from time t2 to t3, the processing in step S1 to step S6 is repeated. Thereafter, at time t3, the process proceeds from step S6 to step S7, where the number of rotations of the electric oil pump is set to 0 rpm and the electric oil pump enters a stopped state, whereby a state where the hydraulic pressure is not generated is set. As the hydraulic pressure is released, in step S7, the vehicle is set to a running non-permitted state (READY-OFF state), and in step S8, control moves to the main routine.

If the vehicle is set to the running non-permitted state in step S7, the vehicle remains stopped in the running non-permitted state until the driver performs again the processing for starting the vehicle using an ignition key switch or the like.

As described above, as shown in FIGS. 2 and 5, the vehicle according to the present embodiment includes the drive wheel, motor-generator MG2 generating drive torque for the drive wheel, hydraulic transmission 6 transmitting the drive torque from the motor-generator MG2 to the drive wheel, electric oil pump 33 generating the source hydraulic pressure for hydraulic transmission 6, engine 10 operated in order to drive the drive wheel, mechanical oil pump 32 rotating upon receiving mechanical power from engine 10 and generating the source hydraulic pressure, and the shift lever for switching a shift range. Control device 27 causes motor-generator MG2 to stop while the shift lever is set to the neutral position, and changes the rotation speed of electric oil pump 33 from the first rotation speed to the second rotation speed lower than the first rotation speed if a state of electric oil pump 33 enters a state where it is not preferable to continue operation at the first rotation speed.

In addition, control device 27 warns a driver to change the shift lever from the neutral position to another position if the vehicle satisfies a prescribed warning condition. The prescribed warning condition includes a condition that the state of electric oil pump 33 enters the state where it is not preferable to continue operation at the first rotation speed.

Moreover, control device 27 sets the vehicle to a running non-permitted state if the shift lever is not changed from the neutral position to another position after warning.

Preferably, the vehicle further includes motor-generator MG1 generating start torque to start engine 10, and planetary gear mechanism 12 serving as a power split device in which three input shafts are mechanically coupled to the crankshaft of engine 10, the rotation shaft of motor-generator MG2, and the rotation shaft of motor-generator MG1 respectively. In the power split device, when rotation of any two input shafts of the three input shafts is set, rotation of remaining one input shaft is forcibly set. Control device 27 sets the vehicle to a state where start of engine 10 is not permitted, by stopping motor-generator MG1 while the shift lever is set to the neutral position.

Configured as above, in the present embodiment, if the shift lever is left in the neutral position for a long time while the hybrid vehicle is carrying out EV running, a state allowing start can be maintained as long as possible, while protecting the electric oil pump.

In addition, the engine can be started by issuing a warning to the driver, and overheat of the electric oil pump can be avoided by switching to the mechanical oil pump.

Further, failure of the electric oil pump can be prevented by setting the vehicle to the running non-permitted state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of a vehicle, wherein
said vehicle includes
 a drive wheel,
 a first rotating electric machine generating drive torque for said drive wheel,
 a hydraulic transmission transmitting the drive torque from said first rotating electric machine to said drive wheel,
 an electric oil pump generating a source hydraulic pressure for said hydraulic transmission,
 an internal combustion engine operated in order to drive said drive wheel,
 a mechanical oil pump rotating upon receiving mechanical power from said internal combustion engine and generating said source hydraulic pressure, and
 a shift lever for switching a shift range, and
said control device is configured to cause said first rotating electric machine to stop when a neutral range is selected by the shift lever, and thereafter change rotation speed of said electric oil pump from a first rotation speed to a second rotation speed lower than said first rotation speed if a state of said electric oil pump enters a state where it is not preferable to continue operation at said first rotation speed.

2. The control device of a vehicle according to claim 1, warning a driver to change a position of said shift lever from said neutral position to another position if the vehicle satisfies a prescribed warning condition, wherein said prescribed warning condition includes a condition that the state of said electric oil pump enters the state where it is not preferable to continue operation at said first rotation speed.

3. The control device of a vehicle according to claim 2, setting the vehicle to a running non-permitted state if said position of said shift lever is not changed from said neutral position to said another position after warning.

4. The control device of a vehicle according to claim 1, wherein said vehicle further includes a second rotating electric machine generating start torque to start said internal combustion engine, and a power split device in which three input shafts are mechanically coupled to a crankshaft of said internal combustion engine, a rotation shaft of said first rotating electric machine, and a rotation shaft of said second rotating electric machine respectively, in said power split device, when rotation of any two input shafts of said three input shafts is set, rotation of remaining one input shaft is forcibly set, and said control device causes said second rotating electric machine to stop while said shift lever is set to a neutral position and sets the vehicle to a state where start of said internal combustion engine is not permitted.

5. A vehicle, comprising:

a drive wheel;

a first rotating electric machine generating drive torque for said drive wheel;

a hydraulic transmission transmitting the drive torque from said first rotating electric machine to said drive wheel;

an electric oil pump generating a source hydraulic pressure for said hydraulic transmission;

an internal combustion engine operated in order to drive said drive wheel;

a mechanical oil pump rotating upon receiving mechanical power from said internal combustion engine and generating said source hydraulic pressure;

a shift lever for switching a shift range; and a control device that is configured to cause said first rotating electric machine to stop when a neutral range is selected by the shift lever, and thereafter change rotation speed of said electric oil pump from a first rotation speed to a second rotation speed lower than said first rotation speed if a state of said electric oil pump enters a state where it is not preferable to continue operation at said first rotation speed.

6. The vehicle according to claim 5, wherein said control device warns a driver to change a position of said shift lever from said neutral position to another position if the vehicle satisfies a prescribed warning condition, and said prescribed warning condition includes a condition that the state of said electric oil pump enters the state where it is not preferable to continue operation at said first rotation speed.

7. The vehicle according to claim 6, wherein said control device sets the vehicle to a running non-permitted state if said position of said shift lever is not changed from said neutral position to said another position after warning.

8. The vehicle according to claim 5, further comprising:

a second rotating electric machine generating start torque to start said internal combustion engine; and a power split device in which three input shafts are mechanically coupled to a crankshaft of said internal combustion engine, a rotation shaft of said first rotating electric machine, and a rotation shaft of said second rotating electric machine respectively; wherein in said power split device, when rotation of any two input shafts of said three input shafts is set, rotation of remaining one input shaft is forcibly set, and said control device causes said second rotating electric machine to stop while said shift lever is set to the neutral position and sets the vehicle to a state where start of said internal combustion engine is not permitted.

9. A method of controlling a vehicle, the vehicle including a drive wheel, a first rotating electric machine generating drive torque for said drive wheel, a hydraulic transmission transmitting the drive torque from said first rotating electric machine to said drive wheel, an electric oil pump generating a source hydraulic pressure for said hydraulic transmission, an internal combustion engine operated in order to drive said drive wheel, a mechanical oil pump rotating upon receiving mechanical power from said internal combustion engine and generating said source hydraulic pressure, and a shift lever for switching a shift range, comprising the steps of:

determining whether the shift range of the vehicle is set to a neutral range during a stop of said internal combustion engine;

causing said first rotating electric machine to stop in response to setting of said shift lever to the neutral range; and changing rotation speed of said electric oil pump from a first rotation speed to a second rotation speed lower than said first rotation speed if a state of said electric oil pump enters a state where it is not preferable to continue operation at said first rotation speed after the shift range is set to the neutral range.

10. The method of controlling a vehicle according to claim 9, further comprising the step of warning a driver to change a position of said shift lever from a neutral position to another position if the vehicle satisfies a prescribed warning condition, wherein said prescribed warning condition includes a condition that the state of said electric oil pump enters the state where it is not preferable to continue operation at said first rotation speed.

11. The method of controlling a vehicle according to claim 10, further comprising the step of setting the vehicle to a running non-permitted state if said position of said shift lever is not changed from said neutral position to said another position after warning.

* * * * *